United States Patent
Imura et al.

[11] Patent Number: 5,880,170
[45] Date of Patent: Mar. 9, 1999

[54] PHOTOPOLYMERIZABLE COMPOSITION AND TRANSPARENT CURED PRODUCT THEREOF

[75] Inventors: Satoshi Imura; Toshihiro Nishitake, both of Tokuyama, Japan

[73] Assignee: Tokuyama Corporation, Tokuyama, Japan

[21] Appl. No.: 820,355

[22] Filed: Mar. 12, 1997

[30]     Foreign Application Priority Data

Mar. 13, 1996  [JP]  Japan ..................................... 8-056464
Oct. 29, 1996  [JP]  Japan ..................................... 8-286884

[51] Int. Cl.$^6$ ............................... C08F 2/46; G02B 3/00; C08J 5/00
[52] U.S. Cl. .......................... 522/104; 522/106; 522/107; 522/108; 359/642; 264/297.2; 264/331.15
[58] Field of Search .................... 522/104, 106, 522/107, 108; 359/642; 264/297.2, 331.15

[56]                References Cited

FOREIGN PATENT DOCUMENTS

| 0231375 | 8/1987 | European Pat. Off. . |
| 0386297 | 9/1990 | European Pat. Off. . |
| 4-11613 | 1/1992 | Japan . |
| 4-11618 | 1/1992 | Japan . |
| 07682330 | 6/1993 | Japan . |
| WO 9005061 | 5/1990 | WIPO . |
| WO 9610760 | 4/1996 | WIPO . |

*Primary Examiner*—Duc Truong

[57]                ABSTRACT

A photopolymerizable composition comprising:

(I) a photopolymerizable oligomer represented by the following formula (1), and/or by the following formula (2), wherein $R^1$ is a hydrogen atom or a methyl group, $R^2$ and $R^3$ are organic groups, X is oxygen or sulfur, n is a number of not smaller than 1, and m is a number of not smaller than 2, or a combination of the above photopolymerizable oligomer and other ethylenically unsaturated monomer which is copolymerizable therewith; and (II) a catalytic amount of a photo-initiator, as well as a transparent cured product thereof. The product obtained by curing the photopolymerizable composition exhibits excellent properties and, particularly, excellent surface precision.

18 Claims, 3 Drawing Sheets

AMOUNT OF ELUTION (ml)

PHOTOPOLYMERIZABLE COMPOSITION AND TRANSPARENT CURED PRODUCT THEREOF

BACKGROUND OF THE INVENTION

1. (Field of the Invention)

The present invention relates to photopolymerizable compositions which can be cured by using active energy rays and transparent cured products obtained by irradiating the above compositions with active energy rays and, particularly, plastic lenses that can be produced within short periods of time exhibiting little optical distortion, excellent transparency, surface precision, impact resistance and tinting property, and are suited for spectacles.

2. (Description of the Prior Art)

Owing to their light weight, impact resistance and tinting property, the glass lenses for spectacles have now been replaced by plastic lenses. A typical plastic lens may be a polymer, i.e., diethylene glycol bisallylcarbonate (CR-39) having a refractive index of as small as about 1.50. In the case of a minus lens having a high power, therefore, the thickness at the edges become so large that the merit of reduced weight which is a feature of a plastic is lost.

In molding the plastic lenses, in general, a polymerizable monomer is poured into between two pieces of glass molds having different radii of curvature, and the lenses are molded based upon the heat polymerization only. According to the method based on the heat polymerization only, however, the polymerization time is usually as long as several hours, which is not satisfactory from the standpoint of productivity of the molded articles.

A method of molding plastic lenses within short periods of time by irradiating a radical polymerizable monomer with active energy rays been disclosed in Japanese Laid-Open Patent Publication No. 166305/1985, and it has been desired to obtain a resin having a high refractive index that can be molded within short periods of time upon irradiation with active energy rays.

When a plastic lens is molded within a short period of time upon irradiation with active energy rays in accordance with the method disclosed in the above publication, however, an internal stress is built up due to the contraction by polymerization, and the central portion of the lens after annealing is deformed due to the internal stress, and the shape of surface of the mold that is used is not correctly transferred.

As a method of decreasing contraction due to polymerization, Japanese Laid-Open Patent Publication No. 254655/1989 discloses a method of photopolymerizing a thioetheracrylate oligomer. However, the above oligomer is poorly compatible with other acrylate monomers or methacrylate monomers, and causes the mixture of the oligomer and these monomers to become into haze when the oligomer is copolymerized with these monomers. That is, in producing the plastic lenses, several kinds of monomers have usually been copolymerized in order to improve lens properties such as heat resistance, hardness, etc. When the oligomer is used, however, strict limitation is imposed on the kind of the monomer that is to be copolymerized.

Japanese Laid-Open Patent Publications Nos. 11613/1992 and 11618/1992 disclose di(meth)acrylate polymerizable compounds having, in the molecules thereof, two ester groups excluding esters due to (meth)acrylate. These compounds, however, exhibit large contraction factors when being cured, and the surfaces of the mold are not correctly transferred to the cured product. Besides, these compounds have poor impact resistance. Moreover, these compounds exhibit poor compatibility to other ethylenically unsaturated monomers. When the mixtures of these compounds and other ethylenically unsaturated monomers are cured, therefore, the cured products are so distorted that the cured products peel off from the mold in many case.

SUMMARY OF THE INVENTION

The object of the present invention is to provide a photopolymerizable composition that can be cured within short periods of time upon irradiation with active energy rays and a transparent cured product thereof and, particularly, to provide a highly refractive plastic lens having excellent lens properties suited for spectacles and, particularly, small optical distortion, excellent transparency, surface precision, impact resistance and tinting property, as well as to provide a photopolymerizable composition suited for the plastic lenses.

Another object of the present invention is to provide a method of efficiently producing the plastic lenses.

According to the present invention, there is provide a photopolymerizable composition comprising:

(I) a photopolymerizable oligomer represented by the following formula (1), $$CH_2=C\underset{\underset{O}{\|}}{\overset{R^1}{\overset{|}{C}}}OR^2O\overset{O}{\overset{\|}{C}}-A-\overset{O}{\overset{\|}{C}}- \quad (1)$$

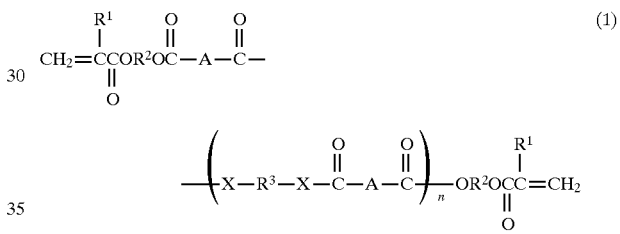

and/or by the following formula (2),

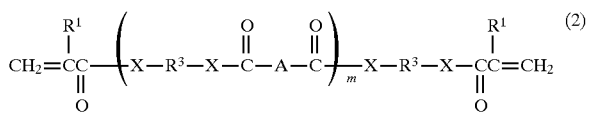

wherein $R^1$ is a hydrogen atom or a methyl group, $R^2$ is an alkylene group having 2 to 10 carbon atoms, A is a divalent hydrocarbon group or a divalent heterocyclic group having 2 to 20 carbon atoms, $R^3$ is an alkylene group having 2 to 10 carbon atoms which may include an atom such as oxygen or sulfur, or a group represented by the formula,

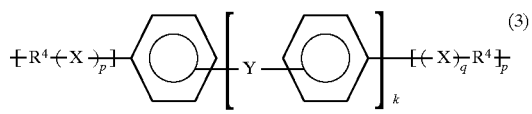

wherein $R^4$ is an alkylene group having not more than 6 carbon atoms, Y is a direct bond or a divalent crosslinking group, k is 0 or 1, q is 0 or 1, and p is number of not smaller than 1, X is an oxygen atom or a sulfur atom, n is a number of not smaller than 1, m is a number of not smaller than 2, and each of $R^1$, $R^2$, $R^3$, A and X may be the same or different, or a combination of the above photopolymerizable oligomer and other ethylenically unsaturated monomer which is copolymerizable therewith; and (II) a catalytic amount of a photo-initiator.

According to the present invention, furthermore, there is provided a transparent cured product obtained by curing the above-mentioned photopolymerizable composition upon irradiation with active energy rays.

According to the present invention, furthermore, there is provided a plastic lens comprising the above-mentioned transparent cured product.

According to the present invention, furthermore, there is provided a method of producing a plastic lens by pouring the above-mentioned photopolymerizable composition into a mold, and irradiating the poured composition with an active energy ray from the outer surface of the mold in order to cure the photopolymerizable composition.

Though the actions and mechanisms have not been clarified yet why a transparent cured product having the above-mentioned excellent properties is obtained from the above-mentioned photopolymerizable composition and, particularly, why a plastic lens is obtained having favorable molded surface transfer properties within short periods of time, they are presumed to be as described below.

That is, the photopolymerizable oligomer used in the present invention has a highly photopolymerizable acryloyl group and/or methacryloyl group and is cured within very short periods of time upon irradiation with the active energy rays. Here, however, it is presumed that the photopolymerizable oligomer has a large molecular weight per a polymer active group and is little contracted upon the polymerization.

Furthermore, the photopolymerizable oligomer used in the present invention has an ester or thioester structure in the main chain skeleton, and presumably maintains good compatibility with other acrylate monomers or methacrylate monomers despite of an increase in the molecular weight thereof. Moreover, the photopolymerizable oligomer used in the present invention is obtained in the form of a mixture of oligomers having different polymerization degrees inclusive of oligomers of relatively low molecular weights such as dimers as will be described later and, hence, exhibits suppressed viscosity and can be favorably handled.

When the above oligomer is photopolymerized, the internal stress is built up little by the contraction of polymerization since the oligomer contracts little due to the polymerization. As a result, there is obtained a plastic lens having good molded surface transfer property.

PREFERRED EMBODIMENT OF THE INVENTION

Figure 1:
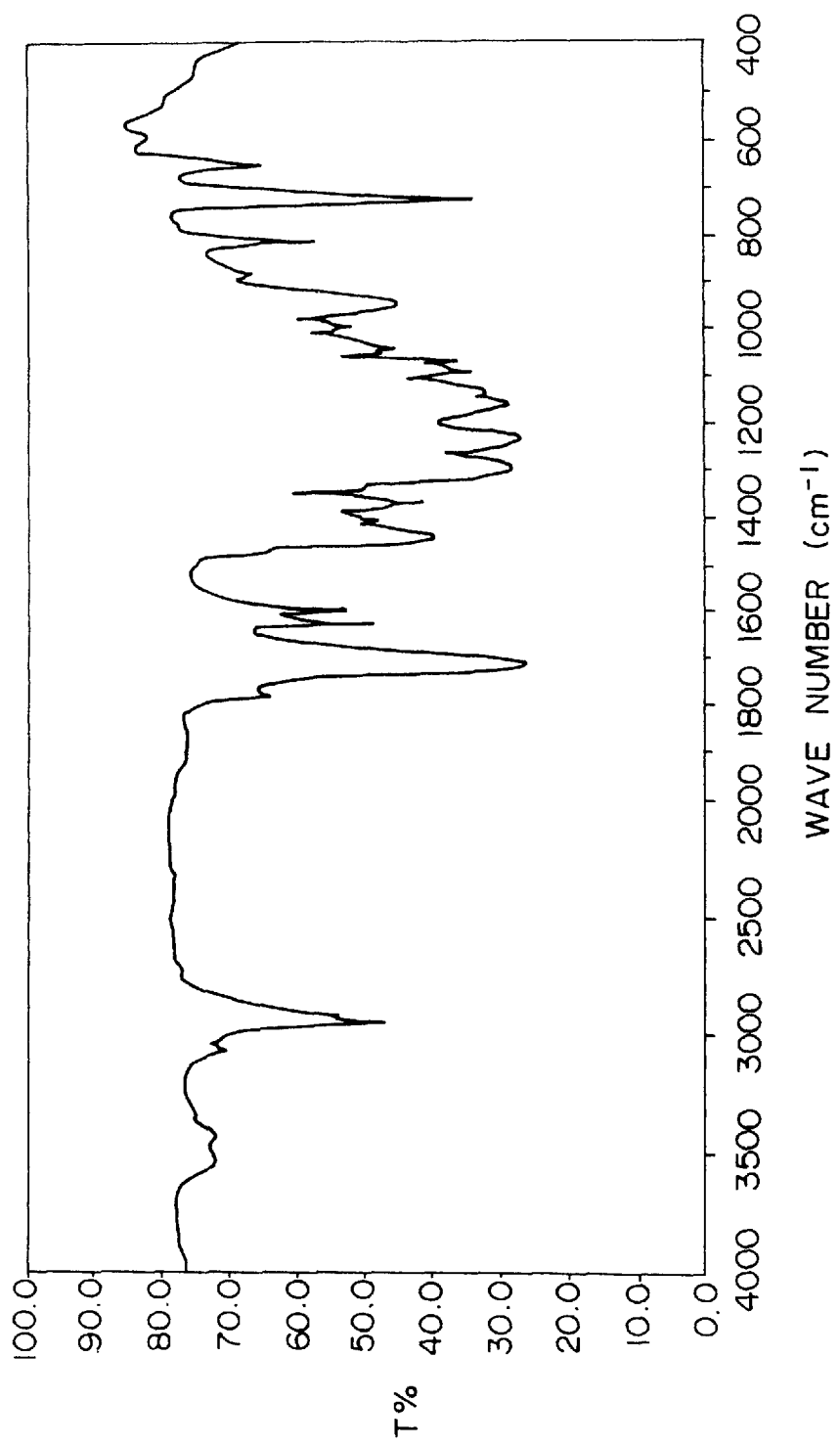
FIG. 1 is an IR chart of a photopolymerizable oligomer obtained by a production 1.

According to the present invention, a distinguished feature resides in that the photopolymerizable composition comprises (I) a photopolymerizable oligomer represented by the above-mentioned formula (1) and/or the above-mentioned formula (2), or a combination of the above photopolymerizable oligomer and other ethylenically unsaturated monomer which is copolymerizable therewith, and (II) a catalytic amount of photo-initiator.
(Photopolymerizable Oligomer)

In the composition of the present invention, the photopolymerizable oligomer of the component (I) is expressed by the above-mentioned formula (1) and/or the above-mentioned formula (2).

In the above-mentioned formulas (1) and (2), $R^1$ is a hydrogen atom or a methyl group; $R^2$ is an alkylene group having 2 to 10 carbon atoms, such as ethylene group, 1,2- or 1,3-propylene group, 1,4-butylene group;

A is hydrocarbon group or a divalent heterocyclic group having 2 to 20 carbon atoms which includes an alkylene group such as ethylene group, 1,4-butylene group or hexamethylene group, arylene group such as phenylene group, naphthalene group, or biphenylene group;

$R^3$ is an alkylene group having 2 to 10 carbon atoms which may include an atom such as oxygen or sulfur, such as —CH$_2$CH$_2$—, —CH$_2$CH$_2$OCH$_2$CH$_2$—, —CH$_2$CH$_2$SCH$_2$CH$_2$—, —CH$_2$CH$_2$SCH$_2$CH$_2$SCH$_2$CH$_2$—, —CH$_2$CH$_2$SCH$_2$CH$_2$SCH$_2$CH$_2$SCH$_2$CH$_2$—, etc., or a group represented by the formula (3),

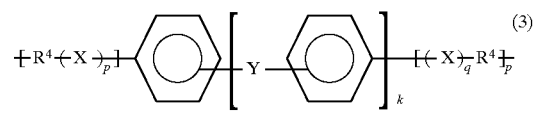

wherein $R^4$ is an alkylene group having not more than 6 carbon atoms, Y is a direct bond or a divalent crosslinking group, k is 0 or 1, q is 0 or 1, and p is a number of not smaller than 1, such as

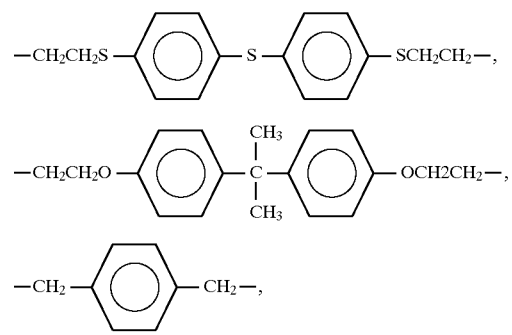

etc.

Among the above-mentioned photopolymerizable oligomer, it is particularly desired to use those in which $R^3$ in the above-mentioned formulas (1) and/or (2) is an alkylene group including a thioether group, and X is an oxygen atom, from the standpoint of decreased odor at the time when the cured product is grinded.

In the general formula (1), it is desired that n lies over a range of from 1 to 4 and in the general formula (2), it is desired that m lies over a range of from 2 to 5.

The photopolymerizable oligomer exists in an amount of at least 10 mol % and, preferably, 10 to 50 mol % per 100 mol % of the polymerizable component in the photopolymerizable composition.
(Synthesis of the Photopolymerizable Oligomer)

The photopolymerizable oligomer of the above-mentioned formula (1) used in the present invention is obtained by the condensation reaction of a carboxyl-terminated polyester of the following formula (4),

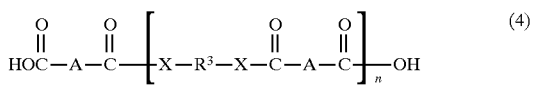

wherein A, X, $R^3$ and n are as defined above, with a hydroxyalkyl(meth)acrylate of the following formula (5),

wherein R1 and $R^2$ are as defined above.

The carboxyl-terminated polyester of the formula (4) is obtained by the condensation of a dibasic acid or a functional derivative thereof of the formula (6),

wherein A is as defined above, and Z is a hydroxyl group, a halogen atom or an alkoxyl group, with a diol or a dithiol of the formula (7),

wherein X and $R^3$ are as defined above, at such a ratio that a molecular chain terminal becomes a carboxyl group.

On the other hand, the photopolymerizable oligomer of the above-mentioned formula (2) used in the present invention is synthesized by reacting a hydroxyl group-terminated or thiol group-terminated polyester of the formula (8),

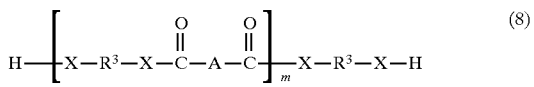

wherein X, $R^3$, A and m are as defined above, with a (meth)acrylic acid or a functional derivative thereof of the formula (9),

wherein $R^1$ and Z are as defined above,

The hydroxyl group-terminated or thiol-terminated polyester of the formula (8) is obtained by the condensation of a dibasic acid or a functional derivative thereof of the formula (6) with a diol or a dithiol of the formula (7) at such a ratio that the molecular chain terminal becomes a hydroxyl terminal or a thiol terminal.

Examples of the compound represented by the general formula (7), i.e., the compound having a total of two hydroxyl groups and/or mercapto groups in the molecules, include ethylene glycol, diethylene glycol, xylene glycol, 3,6-dithia-1,8-octanediol, 3,6,9-trithia-1,11-undecanediol, bis(4-hydroxyethylthiophenyl)sulfide, 2,5-hydroxy-1,4-dithian, 2,2-bis(4-(2-hydroxyethyloxy)phenyl)propane, ethylene oxide adduct or propylene oxide adduct of bisphenol-A or -F; polyvalent mercaptane compounds such as ethane dithiol and bis-2-mercaptoethyl sulfide; and hydroxyl group-containing mercaptane compounds such as 2-mercaptoethanol and 2-mercaptoethoxyethanol. Among them, particularly preferred examples are those having a hydroxyl group at the terminal and including a thioether group in the molecule, such as 3,6,9-trithia-1,11-undecanediol or bis(4-hydroxyethylthiophenyl)sulfide.

The compounds having a total of two hydroxyl groups and/or mercapto groups in the molecules may be used in one kind or in a combination of two or more different kinds. When the compounds are used in a combination of two or more different kinds, the obtained photopolymerizable oligomer becomes asymmetrical. In this case, it is possible to adjust the properties of the oligomer by the asymmetry and, as a result, to further improve the properties of the cured product and, particularly, the lens properties.

Polyhydric alcohols such as glycerin, trimethylolpropane and pentaerythritol may be used in a range in which they do not impair the essential properties of the present invention.

Examples of the dibasic acid or functional derivatives thereof of the general formula (6) include aliphatic carboxylic acids such as succinic acid, adipic acid and sebacic acid; aromatic dicarboxylic acids such as isophthalic acid, terephthalic acid, 2,6-naphthalenedicarboxylic acid, 2,2'-biphenyldicarboxylic acid, 2,5-thiophenedicarboxylic acid, metaxylylenedithioglycolic acid, i.e.,

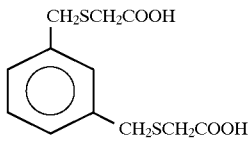

and the like; acyl halide such as isophthalic acid chloride, terephthalic acid chloride, 2,6-naphthalenedicarboxylic acid chloride, 2,2'-biphenyldicarboxylic acid chloride, and 2,5-thiophenedicarboxylic acid chloride; and carboxylic acid esters such as dimethyl isophthalate, dimethyl terephthalate, dimethyl 2,6-naphthalenedicarboxylate, dimethyl 2,2'-biphenyldicarboxylate, and dimethyl 2,5-thiophenedicarboxylate.

These dibasic acids or functional derivatives thereof may be used in one kind or in a combination of two or more different kinds. When different compounds are used in a combination of two or more kinds, it is possible to further improve properties of the cured product and, particularly, lens properties like the one mentioned above.

As the hydroxyalkyl(meth)acrylate of the general formula (5), there can be exemplified 2-hydroxyethylacrylate, 2-hydroxyethylmethacrylate, 3-hydroxypropylacrylate, 3-hydroxypropylmethacrylate, 4-hydroxybutylacrylate and 4-hydroxybutylmethacrylate to which only, however, the invention is in no way limited.

As the (meth)acrylic acid or functional derivatives thereof of the general formula (9), there can be exemplidied (meth)acryl chloride or alkyl ester of (meth)acrylic acid having not more than 5 carbon atoms, such as methyl (meth)acrylate, ethyl (meth)acrylate, propyl (meth)acrylate and butyl (meth)acrylate, in addition to (meth)acrylic acid.

The carboxyl group-terminated polyester of the general formula (4) and the hydroxyl group-terminated or thiol group-terminated polyester of the general formula (8) are synthesized by the dehydration condensation reaction when the dibasic acid component of the formula (6) that is used is a free acid, by the dehydrohalogenation reaction when the dibasic acid component is a halide, and by the ester-interchange reaction when the dibasic acid component is an ester.

When the carboxyl group-terminated polyester of the general formula (4) is to be synthesized, it is desired that the feeding ratio of the diol or the dithiol component of the formula (7) to the dibasic acid component of the formula (6) in the reaction system, i.e., the ratio (total number of carbonyl groups)/(total number of hydroxyl groups and/or thiol groups), is larger than 1 but is not larger than 3. When the hydroxy group-terminated or thiol group-terminated polyester of the formula (8) is to be synthesized, on the other hand, it is desired that the above feeding ratio is larger than 0.5 but is smaller than 1.

In the present invention, the polyester of the formula (4) or the polyester of the formula (8) must satisfy n or m. In the present invention, however, a mixture of polyesters having n or m of different numbers may be used, as a matter of course.

Concretely described below is a method of synthesizing the polyester of the formula (4) or the polyester of the formula (8).

(i) Dehydrohalogenation reaction of a compound containing an acyl halide group with a compound containing a hydroxyl group or a mercapto group.

In this reaction, a hydrogen halide is by-produced. In order to remove the hydrogen halide from the reaction system, in general, it is desired that a base is made present as a hydrogen halide-trapping agent in the reaction system. Any known base can be used has the hydrogen halide-trapping agent without any particular limitation. Preferred examples of the base include trialkylamines such as trimethylamine, triethylamine and tripropylamine, as well as pyridine, tetramethylurea, sodium hydroxide and sodium carbonate. It is desired to use the base in an amount of not smaller than one mol per mol of the acyl halide.

It is, generally, desired to use an organic solvent for the reaction. Preferred examples of the solvent include aliphatic or aromatic hydrocarbons, or halogenated hydrocarbons such as benzene, toluene, xylene, hexane, heptane, petroleum ether, chloroform, methylene chloride and ethylene chloride; ethers such as diethyl ether, dioxane and tetrahydrofurane; N,N-dialkylformamides such as N,N-dimethylformamide and N,N-diethylformamide; and dimethylsulfoxide.

The temperature in the reaction can be selected from a wide range and, generally, from −20° C. to 100° C. and, preferably, from 0° C. to 50° C. The reaction time differs depending upon the starting materials but is usually from 5 minutes to 24 hours and, preferably, from 1 to 4 hours. It is desired that the reaction is carried out with stirring.

Usually, after the reaction, washing with water and drying have been finished, the reaction product can be isolated by distilling off the solvent. After the reaction, however, the reaction product may not be isolated but may be put to the esterification reaction in the second stage.

(ii) Dehydration condensation reaction of a compound containing a carboxyl group with a compound containing a hydroxyl group.

This reaction is usually carried out by using an acid catalyst. Here, the acid catalyst that is desirably used is a mineral acid such as hydrochloric acid or sulfuric acid, an organic acid such as aromatic sulfonic acid, or a Lewis acid such as boron fluoride.

The water is by-produced in the reaction. Since the reaction is an equilibrium reaction, it is desired to remove the water from the system, generally, by using the Dean-Stark water separator, by refluxing a solvent by putting a dehydrating agent such as anhydrous sodium sulfate or molecular Sieves® in the Soxhlet's extractor, or by making present a dehydrating agent such as N,N'-dicyclohexylcarbodiimide or the like in the reaction system.

This method is usually carried out by using a solvent. Preferred examples of the solvent include aromatic hydrocarbons such as benzene and toluene, and halogenated aliphatic hydrocarbons such as chloroform and dichloromethane.

The temperature of the reaction varies depending upon the kind of the solvent but is, generally, from 0° C. to 120° C. The reaction time varies depending upon the kinds of the starting materials and cannot be definitely determined but is preferably selected to be from 20 minutes to 20 hours and, particularly, from 1 hour to 6 hours.

Usually, after the reaction, washing with water and drying have been finished, the reaction product can be isolated by distilling off the solvent. After the reaction, however, the reaction product may not be isolated but may be put to the esterification reaction in the second stage.

(Iii) Ester-interchange reaction of a compound containing an alkoxycarboxyl group with a compound containing a hydroxyl group.

In this reaction, it is desired to use an acid or a base as a catalyst. Examples of the acid that can be favorably used as a catalyst include sulfuric acid, hydrochloric acid and p-toluenesulfonic acid. Examples of the base include inorganic bases such as sodium hydroxide, potassium hydroxide, potassium carbonate and potassium hydrogencarbonate, as well as alkoxides such as sodium methoxide and potassium-t-butoxide.

Low-molecular alcohol compounds are formed in this reaction. Since this reaction is an equilibrium reaction, it is desired to remove alcohols out of the system by distillation or azeotropy.

This reaction is usually carried out without using a solvent. When the starting materials are solids, however, it is desired to use a solvent having a boiling point higher than that of alcohols that are by-produced. Preferred examples of the solvent that can be used include aromatic hydrocarbons or halogen-substituted aromatic hydrocarbons such as benzene, toluene, xylene, chlorobenzene and dichlorobenzene; N,N-dialkylformamides such as N,N-dimethylformamide and N,N-diethylformamide; and dimethylsulfoxide.

Desirably, the reaction is carried out at a temperature at which the by-produced low-molecular alcohols are distilled off. The reaction time may very depending upon the kinds of the starting materials but may be selected to be from 30 minutes to 30 hours and, preferably, from 2 hours to 20 hours. It is desired to carry out the reaction with stirring.

Usually, after the reaction, washing with water and drying have been finished, the reaction product can be isolated by distilling off the solvent. After the reaction, however, the reaction product may not be isolated but may be put to the esterification reaction in the second stage.

A polyester (formula (4) or (8)) which is the reaction product obtained by the esterification reaction of the above first stage, and at least one of acrylic acid, methacrylic acid or a derivative thereof, are further put to the esterification reaction (esterification reaction of the second stage) to obtain a photopolymerizable oligomer. There is no particular limitation on the esterification reaction of the second stage provided it forms an ester bond or a thioester bond based on the reaction of the esterification reaction product of the first stage with at least one of acrylic acid, methacrylic acid or a derivative thereof. Accordingly, the above-mentioned reactions (i) to (iii) can be favorably employed.

In the esterification reaction of the second stage, the reaction product obtained by the esterification reaction of the first stage, which is a reaction reagent, may be used being blended with two or more reaction products obtained by different esterification reactions.

The polymerizable oligomer obtained by the esterification reaction of the second stage is subjected to the after-treatments such as washing with water, drying and distillation of solvent, and is finally obtained in the form of a mixture of oligomers having different structures and molecular weight.

(Other Ethylenically Unsaturated Monomers)

The photopolymerizable composition of the present invention may be further blended with other copolymerizable ethylenically unsaturated monomers in order to improve properties of the cured product and, particularly, to improve lens properties.

Examples of the ethylenically unsaturated monomer include diacrylate compounds and dimethacrylate compounds such as diethylene glycol dimethacrylate, triethylene glycol dimethacrylate, tetraethylene glycol dimethacrylate, butanediol dimethacrylate, hexamethylene dimethacrylate, bisphenol-A dimethacrylate, 2,2-bis(4-methacryloyloxyethoxy-3,5-diboromophenyl)propane, 2,2-bis(4-methacryloyloxyethoxyphenyl)propane, 2,2-bis(4-methacryloyloxyethoxyphenyl)propane, 2,2-bis(4-methacryloyloxytriethoxyphenyl)propane, and 2,2-bis(4-methacryloyloxypentaethoxyphenyl)propane; acrylate compounds or methacrylate compounds having an epoxy group, such as glycidyl acrylate, glycidyl methacrylate, β-methylglycidyl acrylate, β-methylglycidyl methacrylate and bisphenol-A monoglycidylether methacrylate; vinylbenzyl compounds such as bis-4-vinylbenzyl ether, bis-4-vinylbenzyl sulfide, 1,2-(p-vinylbenzyloxy)ethane, 1,2-(p-vinylbenzylthio)ethane and bis-(p-vinylbenzyloxyethyl) sulfide; unsaturated carboxylic acid compounds such as acrylic acid, methacrylic acid, anhydrous maleic acid, fumaric acid, acrylic acid or methacrylic acid ester compounds such as methyl acrylate, methyl methacrylate, benzyl methacrylate, phenyl methacrylate, tribromophenyl methacrylate, 2-hydroxyethyl methacrylate, trifluoromethyl methacrylate, and urethane acrylate; fumaric acid ester compounds such as monomethyl fumarate, diethyl fumarate, and diphenyl fumarate; and aromatic vinyl compounds such as styrene, chlorostyrene, α-methyl styrene, vinyl naphthalene, isopropenyl naphthalene, bromostyrene and divinyl benzene.

As other ethylenically unsaturated monomers, there can be further exemplified unsaturated thioether compounds represented by the following formula (10),

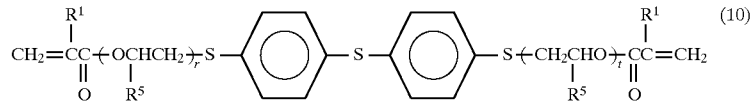

wherein $R^1$ and $R^5$ are, independently from each other, hydrogen atoms or methyl groups, and r and t are, independently from each other, numbers of from 1 to 3.

The above-mentioned unsaturated thioether compound has a highly photopolymerizable acryloyl group and/or methacryloyl group, and is cured within very short periods of time upon the irradiation with active energy rays, and imparts a high refractive index and heat resistance. Furthermore, the thioether compound is a liquid at room temperature. When the above-mentioned photopolymerizable oligomer is viscous, therefore, the unsaturated thioether compound is mixed to the composition to decrease the viscosity. When a copolymerizable monomer that can be blended as a arbitrary component is a solid, furthermore, the unsaturated thioether compound that is added helps dissolve the copolymerizable monomer.

Concrete examples of the unsaturated thioether compound include bis(4-methacryloxyethylyhiophenyl)sulfide, bis(4-methacryloxyethoxyethylthiophenyl)sulfide, bis(4-methacryloxydiethoxyethylyhiophenyl)sulfide, bis(4-acryloxyethylthiophenyl)sulfide, and bis(4-acryloxyethylthiophenyl)sulfide. Among them, bis(4-methacryloxyethylthiophenyl)sulfide, bis(4-methacryloxyethoxyethylthiophenyl)sulfide, bis(4-acryloxyethylthiophenyl)sulfide and bis(4-acryloxyethoxyethylthiophenyl)sulfide are more preferred.

As other ethylenically unsaturated monomers, there can be further blended a monomer of the above-mentioned formula (1) in which n is 0 and/or a monomer of the above-mentioned formula (2) in which m is 0 and/or 1.

It has been known that the monomer of the above-mentioned formula (1) in which n is 0 and/or the monomer of the above-mentioned formula (20 in which m is 0 and/or 1, are partly by-produced at the time of synthesizing the photopolymerizable oligomer.

After the photopolymerizable oligomer is synthesized, therefore, it is advantageous not to remove these by-products having relatively low molecular weights but to use them as the component (I) as it suppresses the increase in the viscosity and makes it easier to handle. When the by-products are to be contained, it is desired that the photopolymerizable oligomer of the invention is contained in an amount of not smaller than 30 mol %. From the standpoint of contraction factor due to polymerization, it is desired that the number average molecular weight of the mixture of the photopolymerizable oligomer and these by-products is in a range of 500 to 1500.

According to the present invention, it is of course able to remove these by-products by the liquid chromatography etc. And use the refined photopolymerizable oligomer. It is further able to use the refined photopolymerizable oligomer and other ethylenically unsaturated monomer in combination.

It is desired that the other ethylenically unsaturated monomer is blended in an amount of from 1 to 400 parts by weight and, preferably, from 1 to 200 parts by weight per 100 parts by weight of the composition.

(Photo-initiator (II))

It is desired that the photopolymerization initiator (II) used in the present invention decomposes upon the irradiation with active energy rays of wavelengths of chiefly from 200 to 500 nm and generates radicals.

The composition of the present invention comprises the photopolymerization initiator and is polymerized and cured within short periods of time upon the irradiation with active energy rays, and is colored little, making it possible to obtain a plastic lens having good surface precision.

Concrete examples of the photo-initiator include acetophenone photopolymerization initiators such as 1-phenyl-2-hydroxy-2-methylpropane-1-one, 1-hydroxycyclohexylphenyl ketone, and 1-(4-isopropylphenyl)-2-hydroxyl-2-methylpropane-1-one; α-dicarbonyl photo-initiator such as 1,2-diphenylethanedione, and methylphenyl glyocylate; and phosphine oxide photo-initiator such as 2,4,6-trimethylbenzoyldiphenylphosphine oxide, bis(2,6-dimethoxybenzoyl)-2,4,4-trimethylpentylphosphine oxide, bis(2,6-dimethylbenzoyl)-2,4,4-trimethylpentylphosphine oxide, bis(2,4,6-trimethylbenzoyl)-2,4,4-trimethylpentylphosphine oxide, and bis(2,6-dichlorobenzoyl)-2,4,4-trimethylpentylphosphine oxide.

These photo-initiator may be used in one kind or in a combination of two or more kinds.

The amount of addition of the photo-initiator varies depending upon the polymerization conditions, kind of the initiator and the composition of the photopolymerization composition, and cannot be definitely determined. From the standpoint of internal homogeneity or hardness of the cured product, however, the photo-initiator is added in an amount of from 0.005 to 1 part by weight and, preferably, from 0.02 to 1 part by weight per 100 parts by weight of the whole polymerizable compound having polymerizing ability.

Furthermore, the photopolymerizable composition of the present invention may be admixed with an organic peroxide or an azo-type heat polymerization initiator. Concrete examples include benzoyl peroxide, diisopropylperoxy dicarbonate, t-butylperoxy isobutylate, and 2,2'-azoisobutylonitrile. The amount of addition of the heat polymerization initiator varies depending upon the polymerization conditions, kind of the initiator and the photopolymerization composition, and cannot be definitely determined, but us from 0.01 to 2 parts by weight per 100 parts by weight of the photopolymerizable composition which comprises the polymerizable oligomer and the photo-initiator.

(Photopolymerizable Composition)

Use of the photopolymerizable composition of the present invention makes it possible to produce easily and within short periods of time an excellent plastic lens having a high refractive index, impact resistance, highly tinting property and high surface precision without being colored.

The photopolymerizable composition of the present invention may be blended with a variety of stabililzers or additives such as parting agent, ultraviolet ray-absorbing agent, ultraviolet ray stabilizer, antioxidizing agent, coloring-preventing agent, antistatic agent, fluorescent dye, dyestuff, pigment, perfume and the like in addition to the above-mentioned polymerizable monomers within ranges in which they do not impair the curing of the present invention.

In the present invention, there is no particular limitation on the method of curing upon irradiation with active energy rays, and any known pouring polymerization method can be favorably employed. A representative curing method may comprise pouring the photopolymerizable composition into between the glass molds held by using an elastomer gasket or a spacer, projecting an active energy ray to effect the curing, followed by parting and annealing.

The active energy ray used in the present invention is an energy ray having a wavelength over a range of from 200 to 500 nm. A source of such an active energy ray should desirably emit ultraviolet rays and visible rays. A preferably employed source of light will be, for example, a metal halide lamp, an ultra-high-pressure mercury lamp, a sterilizer lamp or a xenon lamp.

The irradiation time with the active energy ray for curing differs depending upon the wavelength and intensity of the source of light, shape and material of the polymer, and cannot be definitely determined but is usually not longer than 10 minutes.

When the photopolymerization is to be carried out, at least the surface of the mold irradiated with light must be transparent. Generally, therefore, a glass is used for this portion. In particular, a quartz glass which permits the passage of ultraviolet rays is desired, but there is no particular limitation provided the materials is transparent. It is further able to carry out the polymerization while applying a pressure from the external side during the curing.

The transparent cured product and, particularly, the plastic lens obtained by curing the photopolymerizable composition of the present invention can be subjected to the following processings depending upon the application. That is, tinting using a dispersion dye, reflection-preventing processing and antistatic processing by depositing a silane coupling agent, a hard coating agent comprising chiefly a sol component such as silicon, zirconium, antimony, aluminum, tin or tungsten, a thin film of a metal oxide such as $SiO_2$, $TiO_2$ or $ZrO_2$, or an organic high-molecular thin film, as well as secondary processing.

EXAMPLES

The invention will now be described by way of the Examples to which only, however, the invention is in no way limited.

Described below are the symbols of the reagents that are used.

(1) Divalent carboxylic acid compounds:
   IPC: isophthalic acid chloride
   NC: 2,6-naphthalenedicarboxylic acid chloride
   BC: biphenyl-2,2'-dicarboxylic acid chloride
   TC: 2,5-thiophenedicarboxylic acid chloride (2) Compounds having a total of two or more hydroxyl groups and/or mercapto groups in the molecule:
   EG: ethylene glycol
   ME: mercaptoethanol
   BMES: bis-2-mercaptoethylsulfide
   DTO: 3,6-dithia-1,8-octanediol
   TTU: 3,6,9-trithia-1,11-undecanediol
   BPE1: 2,2-bis(4-(2-hydroxyethyl)phenyl)propane (3) (Meth)acrylic acid compounds:
   AC: acrylic acid chloride
   MAC: methacrylic acid chloride
   MAA: methacrylic acid
   MMA: methyl methacrylate
   HEMA: 2-hydroxyethylmethacrylate (4) Other compounds:
   PTS: p-toluenesulfonic acid
   BME1: bis(4-methacryloxyethylthiophenyl)sulfide
   BME2: bis(4-methacryloxyethoxyethylyhiophenyl) sulfide
   4GDM: polyethylene glycol dimethacrylate (average recurring number=4)
   9GDM: polyethylene glycol dimethacrylate (average recurring number=9)
   BZMA: benzyl methacrylate
   BPEM: 2,2-bis(4-methacryloyloxyethoxyphenyl)propane
   CGI: a mixture of bis(2,6-dimethoxybenzoyl)-2,4,4-trimethylpentylphosphine oxide and 1-phenyl-2-hydroxy-2-methylpropane-1-one at a weight ratio of 1:3
   TPO: 2,4,6-trimethylenzoyldiphenylphosphinoxide
   CR-39: diethylene glycol bisallyl carbonate (Preparation 1)

Into a 300-ml three neck distillation flask was introduced a solution obtained by dissolving 40.6 g (0.2 mols) of an isophthalic acid chloride in 50 ml of a dichloromethane, and the reaction system was cooled with ice. Then, into the flask was dropwisely added a solution obtained by dissolving 24.2 g (0.1 mol) of a 3,6,9-trithia-1,11-undecanediol and 15.8 g (0.2 mols) of a pyridine in 100 ml of dichloromethane. After the dropwise addition, the reaction system was returned back to room temperature and was stirred for one hour to effect the esterification reaction of the first stage. Thereafter, the reaction system was cooled again with ice, and a mixture solution of 26.0 g (0.2 mols) of a 2-hydroxyethyl methacrylate and 15.8 g (0.2 mols) of pyridine was dropwisely added thereto. The reaction system was returned back to room temperature, stirred for one hour to effect the esterification reaction of the second stage. Thereafter, the reaction solution was washed with a dilute aqueous solution of hydrochloric acid and was further washed with a dilute aqueous solution of sodium carbonate, followed by washing with water. The reaction solution was separated, and a dichloromethane layer was distilled off to obtain 70.1 g of an oligomer of which an IR chart is shown in FIG. 1.

A strong absorption due to a carboxyl group was recognized at 1720 cm$^{-1}$ and an absorption due to a terminal vinylidene group was recognized at 1636 cm$^{-1}$.

Figure 2:
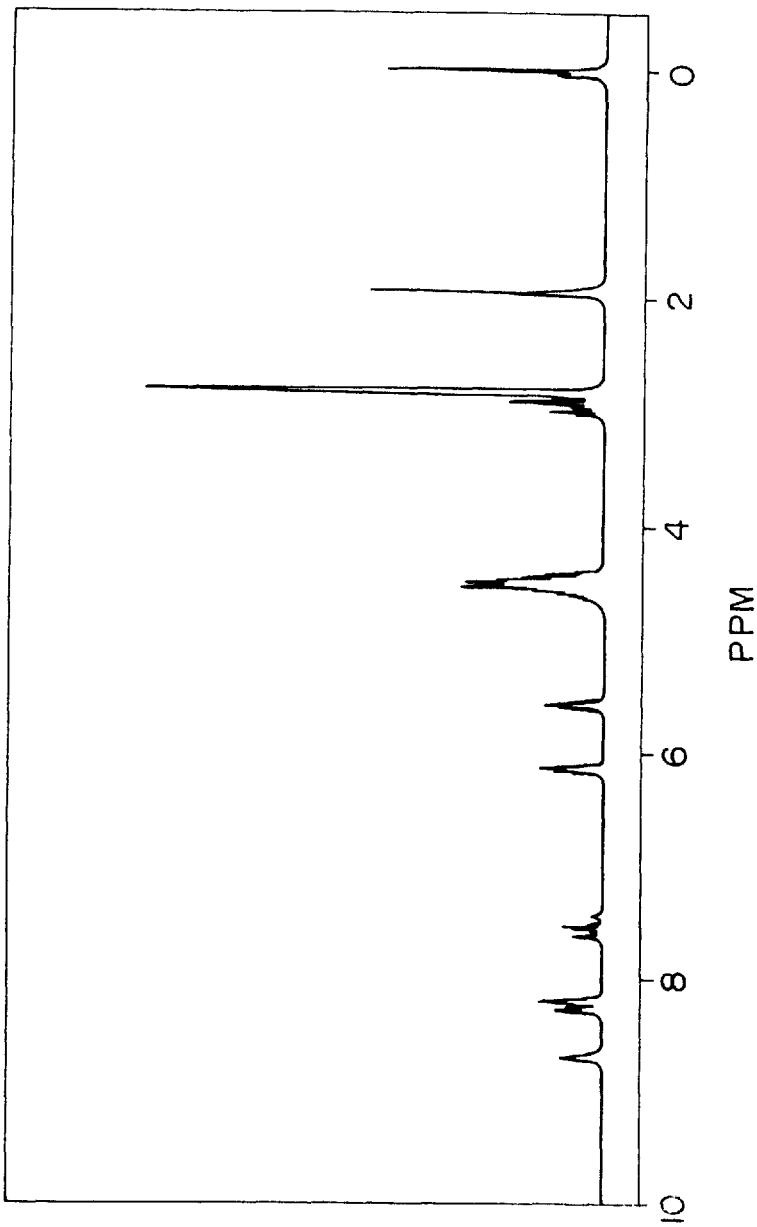
FIG. 2 is a $^1$H-NMR chart (CDCl$_3$), on the basis of tetramethylsilane, ppm) of the photopolymerizable oligomer obtained by the production 1.

FIG. 2 shows a chart of $^1$H-NMR (in a CDCl3 solution, based on tetramethylsilane, ppm) of the oligomer.

The results of analysis were as described below.

By using the monomer described below, a singlet was observed at 1.9 ppm due to hydrogen (c) of a methyl group, a multiplet was observed at 2.7 to 3.1 ppm due to hydrogen (k), (l), (m) of a methylene group bonded to the sulfur atom, a multiplet was observed at 4.4 to 4.7 ppm due to hydrogen (d), (e), (j) of a methylene group bonded to the oxygen atom, a multiplet was observed near 5.5 ppm due to hydrogen (a) of a vinylidene group, a multiplet was observed near 6.1 ppm due to hydrogen (b) of the vinylidene group, and a multiplet was observed at 7.4 to 8.8 ppm due to hydrogen (f), (g), (h) and (i) substituted for a phenyl group. When (a)+(b)=2, the integrated values of the peaks were (c)=3, (k)+(l)+(m)=6, (d)+(e)+(j)=6, and (f)+(g)+(h)+(i)=4.

Figure 3:
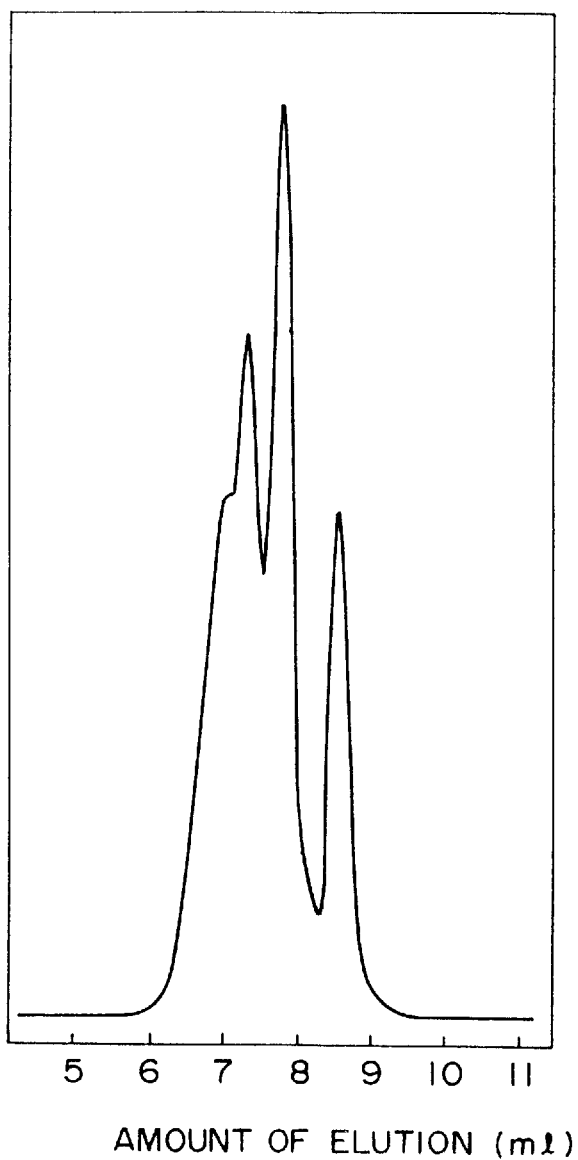
FIG. 3 is a chart of gel permeation chromatography of the photopolymerizable oligomer obtained by the production 1.

FIG. 3 shows the results of a gel permeation chromatography of the obtained photopolymerizable polyester oligomer, from which it will be understood that the product is not a single component but is a mixture of a plurality of components.

By using a high-performance liquid chromatography, the components were separated and were identified for their structures. It was found that a peak near 5 to 7 ml of the amount of elution of FIG. 3 was due to monomers of n=3 (number of esters is 8, excluding esters due to methacrylic group) and of n=4 (number of esters is 10, excluding esters due to methacrylic group), a peak near 7.3 ml was due to a monomer of n=2 (number of esters is 6, excluding esters due to methacrylic group), a peak near 7.8 ml was due to a monomer of n=1 (number of esters is 4, excluding esters due to methacrylic group), and a peak near 8.5 ml was due to a monomer of n=0 (number of esters is 2, excluding esters due to methacrylic groups). An number average molecular weight was found from the composition, which includes the by-product monomer having 2 or less esters (excluding esters due to methacrylic group).

Table 1 shows the composition of the obtained oligomer.

(Preparations 2 to 5)

Oligomers were obtained in the same manner as in Preparation 1 by blending the starting materials as shown in Table 1. The results were as shown in Table 1.

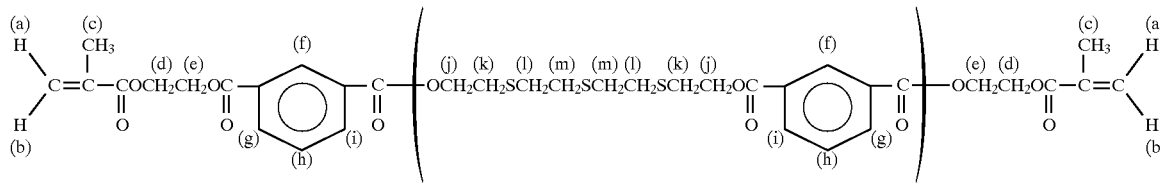

TABLE 1

| Preparation No. | Starting materials for synthesizing oligomer (mol) | | | Starting materials for synthesizing oligomer (mol) | | Photopolymerizable oligomer | | Distribution of ester numbers (mol %) | | | | | Number ave. mol wt. |
|---|---|---|---|---|---|---|---|---|---|---|---|---|---|
| | Carboxylic acid compound | Alcohol or mercaptane compound | Pyridine | (Meth)acrylic acid compound | Pyridine | Appearance | Yield (g) | 0 | 2 | 4 | 6 | 8 or more | |
| 1 | IPC (0.2) | TTU (0.1) | (0.2) | HEMA (0.2) | (0.2) | *1 | 70.1 | 0 | 31 | 43 | 20 | 6 | 800 |
| 2 | IPC (0.2) | TTU (0.13) | (0.26) | HEMA (0.14) | (0.14) | *1 | 66.4 | 0 | 8 | 16 | 44 | 32 | 1200 |
| 3 | BC (0.2) | BMES (0.1) | (0.2) | HEMA (0.2) | (0.2) | *1 | 72 | 0 | 29 | 41 | 22 | 8 | 900 |
| 4 | IPC (0.2) | BMES (0.1) | (0.2) | HEMA (0.2) | (0.2) | *1 | 52.4 | 0 | 30 | 41 | 21 | 8 | 800 |
| 5 | BC (0.2) | DTO (0.1) | (0.2) | HEMA (0.2) | (0.2) | *1 | 78.5 | 0 | 26 | 40 | 23 | 11 | 900 |

Distribution of ester numbers (mol %): excluding esters due to (meth)acrylic acid.
Note; *1: colorless and transparent liquid (Preparation 6)

Into a 300-ml three neck distillation flask was introduced 15.6 g (0.2 mols) of a mercaptoethanol, 100 ml of a dichloromethane and 15.8 g (0.2 mols) of a pyridine, and were mixed with stirring, and the reaction system was cooled with ice. To the reaction system was dropwisely added a solution obtained by dissolving 20.3 g (0.1 mol) of an isophthalic acid chloride in 50 ml of a dichloromethane. After the dropwise addition, the reaction system was returned back to room temperature, and was stirred for one hour to effect the esterification reaction of the first stage. Thereafter, the reaction system was washed with a 0.5N aqueous solution of hydrochloric acid and with water. The reaction solution was separated, and the dichloromethane layer was dehydrated with magnesium sulfate. Thereafter, 15.8 g (0.2 mols) of the pyridine was added thereto and stirred. The reaction system was cooled with ice, and 24.1 g (0.2 mols) of a methacrylic acid chloride was dropwisely added thereto. The reaction system was returned back to room temperature and was stirred for one hour to effect the esterification reaction of the second stage. Thereafter, the reaction solution was washed with a dilute aqueous solution of hydrochloric acid, washed with a dilute aqueous solution of sodium carbonate, and was washed with water. Then, the dichloromethane layer was distilled off to obtain 40.1 g of an oligomer.

Table 2 shows the composition of the obtained oligomer.

(Preparations 7 and 8)

The oligomers were obtained in the same manner as in Preparation 4 by blending the starting materials as shown in Table 2. The results were as shown in Table 2.

mixed and stirred, and the reaction system was cooled with ice. To the reaction system was cooled with ice. To the reaction system was dropwisely added a solution obtained by dissolving 10.2 g (0.05 mols) of the isophthalic acid chloride and 13.9 g (0.05 mols) of a 2,2'-biphenyldicarboxylic acid chloride in 50 ml of the dichloromethane. After the dropwise addition, the reaction system was returned back to room temperature and was stirred for one hour. Thereafter, the reaction system was washed with a dilute aqueous solution of hydrochloric acid and, then, with water. The reaction solution was separated and the dichloromethane layer was dehydrated with magnesium sulfate. Thereafter, the dichloromethane layer was distilled off. The obtained product was transferred into a 500-ml three neck distillation flask, and to which were further introduced 25.8 g (0.3 mols) of the methacrylic acid, 0.2 g (0.001 mol) of a p-toluenesulfonic acid and 300 ml of toluene. The reaction system was heated at 110° C. with stirring, and the dehydration condensation reaction was carried out for one hour. The water that was formed was removed out of the system by the azeotropic distillation with toluene. After the reaction, the reaction solution was washed with dilute hydrochloric acid, a dilute alkali solution and was then washed with water until the reaction solution became neutral. The reaction solution was separated, dehydrated with magnesium sulfate, and toluene was distilled off under a reduced pressure to obtain an oligomer. The product was a colorless and transparent viscous solution, and the yield was 67.7 g.

Table 3 shoes the composition of the obtained oligomer.

TABLE 2

| Preparation No. | Starting materials for synthesizing oligomer (mol) | | | Starting materials for synthesizing oligomer (mol) | | Photopolymerizable oligomer | | | | | | | |
|---|---|---|---|---|---|---|---|---|---|---|---|---|---|
| | Carboxylic acid compound | Alcohol or mercaptane compound | Pyridine | (Meth)acrylic acid compound | Pyridine | Appearance | Yield (g) | \multicolumn{5}{c}{Distribution of ester numbers (mol %)} | Number ave. mol wt. |
| | | | | | | | | 0 | 2 | 4 | 6 | 8 or more | |
| 6 | IPC (0.1) | ME (0.2) | (0.2) | MAC (0.2) | (0.2) | *1 | 40.1 | 25 | 44 | 20 | 8 | 3 | 500 |
| 7 | IPC (0.1) | ME (0.13) | (0.3) | MAC (0.067) | (0.067) | *1 | 22 | 5 | 17 | 43 | 24 | 11 | 900 |
| 8 | BC (0.1) | ME (0.2) | (0.2) | AC (0.2) | (0.2) | *1 | 45.8 | 26 | 43 | 21 | 7 | 3 | 600 |

Distribution of ester numbers (mol %): excluding esters due to (meth)acrylic acid.
Note; *1: colorless and transparent liquid (Preparation 9)

Into a 300-ml three neck distillation flask was introduced 48.4 g (0.2 mols) of a 3,6,9-trithia-1,11-undecanediol, 100 ml of a dichloromethane and 15.8 g (0.2 mols) of a pyridine, (Preparations 10 to 13)

Oligomers were obtained in the same manner as in preparation 6 by blending the starting materials as shown in Table 3. The results were as shown in Table 3.

TABLE 3

| Preparation No. | Starting materials for synthesizing oligomer (mol) | | | Starting materials for synthesizing oligomer (mol) | | Photopolymerizable oligomer | | | | | | | |
|---|---|---|---|---|---|---|---|---|---|---|---|---|---|
| | Carboxylic acid compound | Alcohol or mercaptane compound | Pyridine | (Meth)acrylic acid compound | PTS | Appearance | Yield (g) | \multicolumn{5}{c}{Distribution of ester numbers (mol %)} | Number ave. mol wt. |
| | | | | | | | | 0 | 2 | 4 | 6 | 8 or more | |
| 9 | IPC (0.05) BC (0.05) | TTU (0.2) | (0.2) | MMA (0.3) | (0.001) | *1 | 67.7 | 25 | 41 | 21 | 11 | 2 | 900 |
| 10 | IPC (0.1) TC (0.1) | EG (0.3) | (0.4) | MAA (0.3) | (0.001) | *1 | 48.9 | 10 | 17 | 37 | 25 | 11 | 700 |

TABLE 3-continued

| Preparation No. | Starting materials for synthesizing oligomer (mol) | | | Starting materials for synthesizing oligomer (mol) | | Photopolymerizable oligomer | | | | | | | |
|---|---|---|---|---|---|---|---|---|---|---|---|---|---|
| | Carboxylic acid compound | Alcohol or mercaptane compound | Pyridine | (Meth)acrylic acid compound | PTS | Appearance | Yield (g) | Distribution of ester numbers (mol %) | | | | | Number ave. mol wt. |
| | | | | | | | | 0 | 2 | 4 | 6 | 8 or more | |
| 11 | IPC (0.05) BC (0.05) | EG (0.1) BMES (0.05) | (0.2) | MAA (0.3) | (0.001) | *1 | 33.4 | 8 | 18 | 38 | 25 | 11 | 1000 |
| 12 | IPC (0.05) TC (0.05) | ME (0.15) | (0.2) | MAA (0.3) | (0.001) | *1 | 30.2 | 10 | 18 | 36 | 24 | 12 | 800 |
| 13 | IPC (0.05) NC (0.05) | EG (0.1) BMES (0.05) | (0.2) | MAA (0.3) | (0.001) | *1 | 28.1 | 8 | 16 | 38 | 26 | 12 | 800 |

Distribution of ester numbers (mol %): excluding esters due to (methyl)acrylic acid.
Note; *1: colorless and transparent liquid (Preparation 14)

To the 300-ml three neck distillation flask was introduced 6.2 g (0.1 mol) of an ethylene glycol, 7.7 g (0.05 mols) of a bis-2-mercaptoethyl sulfide, 100 ml of a dichloromethane and 15.8 g (0.2 mols) of a pyridine, and were mixed and stirred, and the reaction system was cooled with ice. To the reaction system was dropwisely added a solution obtained by dissolving 20.3 g (0.1 mol) of the isophthalic acid chloride and 20.9 g (0.1 mol) of a 2,5-thiophenedicarboxylic acid chloride in 50 ml of the dichloromethane. After the dropwise addition, the reaction system was returned back to room temperature and was stirred for one hour. Thereafter, the reaction system was washed with a dilute aqueous solution of hydrochloric acid and then with water. The reaction solution was separated, and the dichloromethane layer was dehydrated with magnesium sulfate. Thereafter, the dichloromethane layer was distilled off. The obtained product was transferred into the 500-ml three neck distillation flask and, then, 30 g (0.3 mols) of methyl methacrylate, 0.2 g (0.005 mols) of a powdery sodium hydroxyde and 300 ml of toluene were introduced thereto. The reaction system was heated at 110° C. with stirring, and the ester-interchange reaction was carried out for one hour. The formed methanol was removed out of the system by distillation. After the reaction, the reaction solution was washed with dilute hydrochloric acid and a dilute alkali solution and was then washed with water until the reaction solution became neutral. The reaction solution was separated, dehydrated with magnesium sulfate, and toluene was distilled off under a reduced pressure to obtain an oligomer. The product was a colorless and transparent viscous solution, and the yield was 62.6 g.

The average molecular weight (reckoned as polystyrene) of the obtained oligomer was 800 as measured by the gel permeation chromatography.

(Preparation 15)

An oligomer was obtained in the same manner as in preparation 9 by blending the starting materials as shown in Table 4. The results were as shown in Table 4.

TABLE 4

| Preparation No. | Starting materials for synthesizing oligomer (mol) | | | Starting materials for synthesizing oligomer (mol) | | Photopolymerizable oligomer | | | | | | | |
|---|---|---|---|---|---|---|---|---|---|---|---|---|---|
| | Carboxylic acid compound | Alcohol or mercaptane compound | Pyridine | (Meth)acrylic acid compound | NaOH | Appearance | Yield (g) | Distribution of ester numbers (mol %) | | | | | Number ave. mol wt. |
| | | | | | | | | 0 | 2 | 4 | 6 | 8 or more | |
| 14 | IPC (0.05) TC (0.05) | EG (0.1) BMES (0.05) | (0.2) | MAA (0.3) | (0.005) | *1 | 31.3 | 18 | 39 | 26 | 13 | 4 | 800 |
| 15 | TC (0.1) | BPE1 (0.2) | (0.2) | MAA (0.3) | (0.005) | *1 | 81.4 | 12 | 23 | 42 | 18 | 5 | 1200 |

Distribution of ester numbers (mol %): excluding esters due to (meth)acrylic acid.
Note; *1: colorless and transparent liquid (Example 1)

To 100 parts by weight of the photopolymerizable polyester oligomer obtained in preparation 1 was added 0.05 parts by weight of the CGI as a photo-initiator, and was mixed together to a sufficient degree followed by deaeration under a reduced pressure. The solution was poured into a mold constituted by glass molds having an outer diameter of 80 mm and radii of curvature of 210 mm and 75 mm which are so combined together by using a gasket of an ethylene/vinyl acetate copolymer as to form a concave lens having a thickness at the center of 1.5 mm, and both surfaces were irradiated with ultraviolet rays of a 1.5-KW metal halide lamp from a distance of 15 cm for two minutes. The solution was completely cured. The cured plastic lens was taken out from the mold, annealed at 110° C. for two hours to evaluate the refractive index, Abbe's number, appearance, optical distortion, surface precision, contraction factor and impact resistance by the methods described below. The results were as shown in Table 5.

Moreover, 80 parts by weight of the photopolymerizable polyester oligomer obtained in preparation 1 and 20 parts by weight of a benzyl methacrylate (copolymerizable composition A) were mixed together, 0.05 parts by weight of CGI was added thereto as the photo-initiator, and was mixed together to a sufficient degree, followed by deaeration under a reduced pressure. The obtained monomer solution was poured into a mold constituted by two pieces of glass molds having an outer diameter of 80 mm which are so combined together by using a gasket of an ethylene/vinyl acetate copolymer so as to form a flat plate having a thickness at the center of 2.0 mm, and both surfaces were irradiated with ultraviolet rays of the 1.5-KW metal halide lamp from a distance of 15 cm for two minutes. The monomer solution cured completely. The cured plastic lens was taken out from the mold and was annealed at 110° C. for two hours in order to evaluate the appearance. The results were as shown in Table 5.

Furthermore, a mixture of 80 parts by weight of the photopolymerizable polyester oligomer obtained by preparation 1 and 20 parts by weight of a methyl methacrylate (copolymerizable composition B) was treated in the same manner as the copolymerizable composition A, and was cured completely. The cured plastic lens was taken out from the mold and was annealed at 110° C. for two hours to evaluate the appearance. The results were as shown in Table 5.

(Methods of Evaluation)

Refractive index and Abbe's number: Measured at 20° C. using Abbe's refractometer manufactured by Atago Co.

Appearance: Evaluated by eyes.

Optical distortion: Measured by the orthogonal Nicol's method in which the polarizer planes of two pieces of polarizer plates were intersected at right angles, and the distortion due to polymerization was evaluated.

The evaluation was on the following basis:
(○) No distortion.
(×) distorted.

Surface precision: The concave surfaces of the lens were observed by eyes to evaluate the surface precision.

The evaluation was on the following basis:
(○) Not warped
(Δ) Slightly warped
(×) warped Contraction factor: (1—(specific gravity of the composition of before cured/specific gravity of the composition of after cured))

Impact resistance: Steel balls weighing 16 g, 32 g, 48 g, 64 g, 80 g, 96 g, 112 g, 131 g, 151 g were permitted to naturally fall on each of 5 to 10 pieces of test boards having a thickness of 2 mm and a diameter of 65 mm from the height of 127 cm. The impact resistance was evaluated as an average weight of the heaviest steel ball by which the test boards were not broken.

(Examples 2 to 15)

The photopolymerizable oligomers obtained in the preparations 2 to 15 were irradiated with ultraviolet rays in the same manner as in Example 1, and sufficiently cured plastic lenses were obtained in all of the cases. The plastic lenses were taken out from the molds and were annealed in the same manner as in Example 1 to evaluate. The results were as shown in Table 5.

(Comparative Example 1)

A terminal dihalogen oligomer was synthesized from an α,α'-dichloro-p-xylene (0.2 mols) and a dimercaptoethane (0.1 mol) in 100 ml of an isopropyl alcohol by using a potassium carbonate (0.5 mols), and was further reacted with a 2-mercaptoethanol (0.2 mols). The obtained terminal alcohol oligomer was further methacrylated with the methacrylic acid chloride (0.2 mols) and pyridine (0.2 mols) to obtain a dimethacrylate polythioether oligomer (average molecular weight of 600) which was then molded and evaluated in the same manner as in Example 1. The results were as shown in Table 5.

(Comparative Example 2)

A 1,4-dihydroxyethylbenzene was synthesized from a benzenedithiol (0.1 mol) and an ethylene chlorohydrin (0.2 mols) by using a sodium hydroxide (0.22 mols), and was further methacrylated with the methacrylic acid chloride (0.2 mols) and pyridine (0.2 mols) to obtain a 1,4-dimethacryloyloxyethyl thiobenzene which was then cured and evaluated in the same manner as in Example 1. As a result, the contraction due to polymerization was so great that the compound peeled off the mold during the polymerization, and a lens could not be obtained.

(Comparative Example 3)

A monomer having two ester bonds (excluding ester bonds due to methacrylate) in the molecule of Example 1 was synthesized from an isophthalic acid chloride (0.1 mol) and a 2-hydroxyethyl methacrylate (0.2 mols) by using pyridine (0.2 mols), and was then molded and evaluated in the same manner as in Example 1.

TABLE 5

| Example No. | Prep. No. Of photo-polymerizable oligomer | Evaluation of homopolymers | | | | | | Appearance of cured copolymer A | Appearance of cured copolymer B |
| --- | --- | --- | --- | --- | --- | --- | --- | --- | --- |
| | | Refractive index | Abbe's number | Appearance | Optical distortion | Surface precision | Contraction factor (%) | Impact resistance (g) | |
| 1 | 1 | 1.590 | 35 | *1 | ○ | ○ | 4.2 | 130 | *1 | *1 |
| 2 | 2 | 1.605 | 33 | *1 | ○ | ○ | 3.2 | 150 | *1 | *1 |
| 3 | 3 | 1.615 | 33 | *1 | ○ | ○ | 4.0 | 130 | *1 | *1 |
| 4 | 4 | 1.607 | 33 | *1 | ○ | ○ | 4.2 | 140 | *1 | *1 |
| 5 | 5 | 1.595 | 34 | *1 | ○ | ○ | 4.5 | 130 | *1 | *1 |
| 6 | 6 | 1.596 | 36 | *1 | ○ | ○ | 6.4 | 120 | *1 | *1 |
| 7 | 7 | 1.611 | 33 | *1 | ○ | ○ | 3.6 | 130 | *1 | *1 |
| 8 | 8 | 1.600 | 35 | *1 | ○ | ○ | 5.8 | 120 | *1 | *1 |
| 9 | 9 | 1.594 | 37 | *1 | ○ | ○ | 3.4 | 150 | *1 | *1 |
| 10 | 10 | 1.560 | 38 | *1 | ○ | ○ | 4.1 | 130 | *1 | *1 |
| 11 | 11 | 1.612 | 33 | *1 | ○ | ○ | 3.9 | 150 | *1 | *1 |
| 12 | 12 | 1.617 | 33 | *1 | ○ | ○ | 4.1 | 120 | *1 | *1 |
| 13 | 13 | 1.626 | 31 | *1 | ○ | ○ | 4 | 110 | *1 | *1 |
| 14 | 14 | 1.600 | 35 | *1 | ○ | ○ | 4.5 | 130 | *1 | *1 |
| 15 | 15 | 1.583 | 37 | *1 | ○ | ○ | 3.5 | 150 | *1 | *1 |

TABLE 5-continued

| | Prep. | Evaluation of homopolymers | | | | | | | Appearance | Appearance |
|---|---|---|---|---|---|---|---|---|---|---|
| Example No. | No. Of photo-polymerizable oligomer | Refractive index | Abbe's number | Appearance | Optical distortion | Surface precision | Contraction factor (%) | Impact resistance (g) | of cured copolymer A | of cured copolymer B |
| Com. Ex. 1 | — | 1.625 | 32 | *2 | ○ | Δ | 4.3 | 60 | hazed | hazed |
| Com. Ex. 2 | — | — | — | peeled | x | x | — | — | peeled | peeled |
| Com. Ex. 3 | — | 1.546 | 37 | *1 | x | x | 11.5 | 50 | *1 | peeled |

(Note)
*1: colorless and transparent
*2: pale yellow, transparent
peeled: cured product was distorted, and gap was formed between the mole and the cured product.

Referring to Table 5, the refractive indexes of the cured products of homopolymers were 1.560 to 1.616 in Examples 1 to 15, and were 1.546 and 1.625 in Comparative Examples 1 and 3, representing a small difference between Examples and Comparative Examples in terms of numerical figures. When the cured products obtained in Examples and Comparative Examples were practically observed, however, the cured products obtained in Examples 1 to 15 were colorless, transparent and were not distorted permitting the material body on the opposite side of the cured products to be correctly seen through. The cured products obtained in Comparative Examples 1 and 3, however, were obviously colored or distorted. When such distorted lenses are used for extended periods of time, the eyes are very tired, which is not desirable.

It will be further understood from Table 5 above that the products of Comparative Examples 1 and 3 have impact resistances of as low as 50 to 60 g, which are smaller than one-half those of Examples 1 to 15.

Furthermore, observation proved that with the cured products obtained in Comparative Examples, transfer of the surfaces of the mold worsened toward the center of the surfaces of the cured products, and the lenses possessed poor surface precision.

(Examples 16 to 22)

The photopolymerizable composition of the photopolymerizable polyester oligomers obtained in Preparations 1, 5 and 9, and the ethylenically unsaturated monomers and photopolymerization initiators shown in Table 6, were irradiated with ultraviolet rays in the same manner as in Example 1, and sufficiently cured plastic lenses were obtained in all of the cases. The plastic lenses were taken out from the molds and were annealed in the same manner as in Example 1 to evaluate. The results were as shown in Table 6.

(Comparative Example 4)

A diisopropylperoxydicarbonate (3 parts) was added to a diethylene glycol bisarylcarbonate (CR-39) (100 parts) and was mixed to a sufficient degree and was deaerated under a reduced pressure. This solution was poured into a mold constituted by a glass plate and a gasket composed of an ethylene/vinyl acetate copolymer. Thereafter, the heat polymerization was carried out at 45° C. for 8 hours, at 60° C. for 3 hours, at 80° C. for 3 hours and at 95° C. for 4 hours. After cured, the polymer was taken out from the mold, annealed at 110° C. for 2 hours and was evaluated in the same manner as in Example 1. The results were as shown in Table 6.

(Comparative Examples 5 to 7)

The polymerizable compositions shown in Table 6 were irradiated with ultraviolet rays in the same manner as in Example 1. The plastic lenses were taken out from the mold and were annealed in the same manner as in Example 1 to evaluate. The results were as shown in Table 6.

TABLE 6

| | Photo-polymerizable Oligomer (pts. by wt.) | Monomer 1 (pts. by wt.) | Monomer 2 (Pts. by wt.) | Photo-initiator (Pts. by wt. | Refractive index (20° C.) | Abbe's number | Appearance | Optical distortion | Surface precision | Contraction factor (%) | Impact resistance (g) | Tinting property |
|---|---|---|---|---|---|---|---|---|---|---|---|---|
| Ex. 16 | Prep. 1 (30) | BME1 (70) | — | CGI (0.05) | 1.631 | 28 | *1 | ○ | ○ | 8.9 | 87 | ○ |
| Ex. 17 | Prep. 1 (55) | BME1 (35) | 4GDM (10) | CGI (0.05) | 1.600 | 33 | *1 | ○ | ○ | 6.2 | 103 | ⊚ |
| Ex. 18 | Prep. 1 (60) | BME2 (40) | — | TPO (0.05) | 1.609 | 31 | *1 | ○ | ○ | 5.9 | 112 | ⊚ |
| Ex. 19 | Prep. 5 (40) | BME2 (45) | BzMA (15) | CGI (0.05) | 1.612 | 32 | *1 | ○ | ○ | 6.0 | 92 | ⊚ |
| Ex. 20 | Prep. 5 (35) | BME2 (55) | BPEM (15) | CGI (0.05) | 1.607 | 30 | *1 | ○ | ○ | 6.3 | 80 | ○ |
| Ex. 21 | Prep. 5 (70) | BME2 (25) | BzMA (5) | TPO (0.05) | 1.606 | 29 | *1 | ○ | ○ | 9.3 | 127 | ⊚ |
| Ex. 22 | Prep. 9 (70) | — | 4GDM (30) | CGI (0.05) | 1.571 | 43 | *1 | ○ | ○ | 5.8 | 132 | ⊚ |

TABLE 6-continued

| | Photo-polymerizable Oligomer (pts. by wt.) | Monomer 1 (pts. by wt.) | Monomer 2 (Pts. by wt.) | Photo-initiator (Pts. by wt.) | Refractive index (20° C.) | Abbe's number | Appearance | Optical distortion | Surface precision | Contraction factor (%) | Impact resistance (g) | Tinting property |
|---|---|---|---|---|---|---|---|---|---|---|---|---|
| Comp. Ex. 4 | — | CR-39 (100) | — | — | 1.499 | 59 | *1 | ○ | ○ | 13 | 91 | ○ |
| Comp. Ex. 5 | — | BME1 (100) | — | CGI (0.05) | 1.65 | could not be measured | *2 | x | x | 11.2 | 30 | x |
| Comp. Ex. 6 | — | BME1 (70) | 9GDM (30) | CGI (0.05) | 1.605 | 25 | *1 | ○ | x | 10.4 | 46 | ○ |
| Comp. Ex. 7 | Prep. 2 (18) | 4GDM (40) | BPEM (42) | CGI (0.05) | 1.557 | 43 | *1 | ○ | x | 13.1 | 64 | ○ |

(Note)
*1: colorless and translarent
*2: pale yellow, transparent

As shown in Table 6, the cured products obtained in Examples 16 to 22 were colorless and transparent, and were not distorted.

Furthermore, observation proved that with the cured products obtained in Comparative Examples, transfer of the surfaces of the mold worsened toward the center of the surfaces of the cured products, and the lenses possessed poor surface precision. These, however, did not happen with the cured products of Examples 16 to 22.

We claim:

1. A photopolymerizable composition comprising:

(I) a photopolymerizable oligomer represented by the following formula (1),

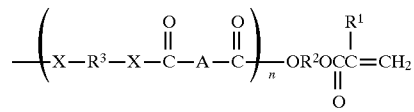

and/or by the following formula (2),

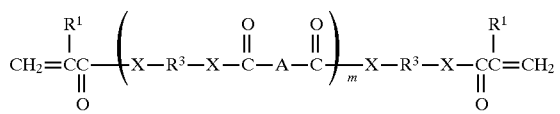

wherein $R^1$ is a hydrogen atom or a methyl group, $R^2$ is an alkylene group having 2 to 10 carbon atoms, A is a divalent hydrocarbon group or a divalent heterocyclic group having 2 to 20 carbon atoms, $R^3$ is an alkylene group having 2 to 10 carbon atoms including a thioether group, X is an oxygen atom, n is a number of not smaller than 1, m is a number of not smaller than 2, and each of $R^1$, $R^2$ and $R^3$, A and X may be the same or different, or a combination of the above photopolymerizable oligomer and other ethylenically unsaturated monomer which is copolymerizable therewith; and II a catalytic amount of a photo-initiator.

2. A photopolymerizable composition according to claim 1, wherein at least part of the other ethylenically unsaturated monomer is a monomer of the formula (1) wherein n is 0 and/or is a monomer of the formula (2) wherein m is 0 and/or 1.

3. A photopolymerizable composition according to claim 2, wherein a mixture of the photopolymerizable oligomer of the formula (1) in which n is not smaller than 1 and the monomer in which n is 0, or a mixture of the photopolymerizable oligomer of the formula (2) in which m is not smaller than 2 and the monomer in which m is 0 and/or 1, has a number average molecular weight of from 500 to 1500.

4. A photopolymerizable composition according to claim 1, wherein at least part of the other ethylenically unsaturated monomer is a monomer represented by the formula (10),

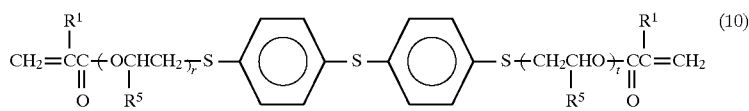

wherein $R^1$ and $R^5$ are, independently from each other, hydrogen atoms or methyl groups, and r and t are, independently from each other, numbers of from 1 to 3.

5. A photopolymerizable composition according to claim 1, wherein the photopolymerizable oligomer is present in an amount of at least 10 mol % per 100 mol % of the polymerizable components in the composition.

6. A photopolymerizable composition according to claim 1, wherein at least part of the other ethylenically unsaturated monomer is a monomer represented by the formula

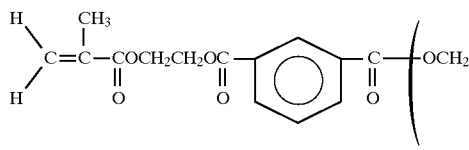
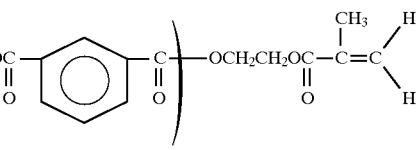

7. The photopolymerizable composition of claim 1, wherein the photopolymerizable oligomer is in an amount of 10 to 50 mol % per 100 mol % of the polymerizable component.

8. The photopolymerizable composition of claim 1, wherein in formula (1) n is 1 to 4 and in formula (2) m is 2 to 5.

9. A photopolymerizable composition comprising:
(I) a photopolymerizable oligomer represented by the following formula (1),

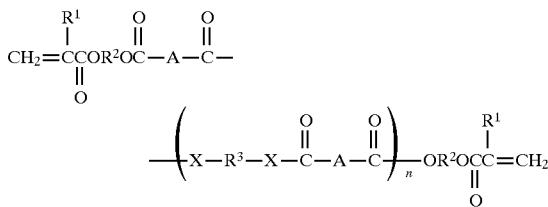

and/or by the following formula (2),

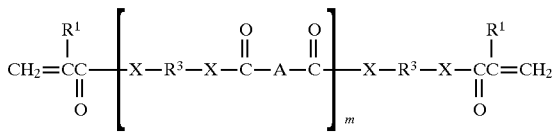

wherein $R^1$ is a hydrogen atom or a methyl group, $R^2$ is an alkylene group which is a member selected from the group consisting of ethylene group, 1,2-propylene group, 1,3-propylene group, and 1,4-butylene group, A is a divalent hydrocarbon group which is a member selected from the group consisting of ethylene group, 1,4-butylene group, hexamethylene group, phenylene group, naphthalene group, and biphenylene group, $R^3$ is a hydrocarbon group which is a member selected from the group consisting of $-CH_2CH_2SCH_2CH_2-$, $-CH_2CH_2SCH_2CH_2SCH_2CH_2-$, $-CH_2CH_2SCH_2CH_2SCH_2CH_2SCH_2CH_2-$, and

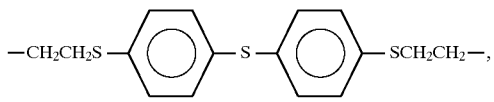

X is an oxygen atom, n is a number not smaller than 1, m is a number not smaller than 2, and each of $R^1$, $R^2$, $R^3$, A and X may be the same or different, or a combination of the above photopolymerizable oligomer and other ethylenically unsaturated monomer which is copolymerizable therewith; and (II) a catalytic amount of a photo-initiator.

10. The photopolymerizable composition of claim 9, wherein the photopolymerizable oligomer is in an amount of 10 to 50 mol % per 100 mol % of the polymerizable component.

11. The photopolymerizable composition of claim 9, wherein in formula (1) n is 1 to 4 and in formula (2) m is 2 to 5.

12. A photopolymerizable composition comprising:
(I) a photopolymerizable oligomer represented by the following formula (1),

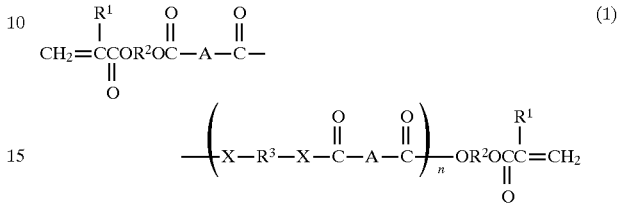

wherein $R^1$ is a hydrogen atom or a methyl group, $R^2$ is an alkylene group having 2 to 10 carbon atoms, A is a divalent hydrocarbon group having 2 to 20 carbon atoms, $R^3$ is an alkylene group having 2 to 10 carbon atoms including a thioether group, X is an oxygen atom, n is a number not smaller than 1, m is a number not smaller than 2, and each of $R^1$, $R^2$, $R^3$, A and X may be the same or different, or a combination of the above photopolymerizable oligomer and other ethylenically unsaturated monomer which is copolymerizable therewith; and (II) a catalytic amount of a photo-initiator.

13. The photopolymerizable composition of claim 12, wherein the photopolymerizable oligomer is in an amount of 10 to 50 mol % per 100 mol % of the polymerizable component.

14. A photopolymerizable composition comprising:
(I) a photopolymerizable oligomer represented by the following formula (2),

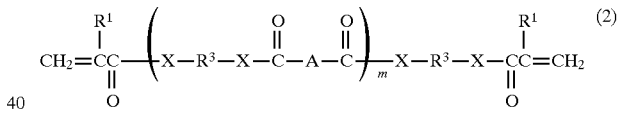

wherein $R^1$ is a hydrogen atom or a methyl group, $R^2$ is an alkylene group having 2 to 10 carbon atoms, A is a divalent hydrocarbon group having 2 to 20 carbon atoms, $R^3$ is an alkylene group having 2 to 10 carbon atoms including a thioether group, X is an oxygen atom, n is a number not smaller than 1, m is a number not smaller than 2, and each of $R^1$, $R^2$, $R^3$, A and X may be the same or different, or a combination of the above photopolymerizable oligomer and other ethylenically unsaturated monomer which is copolymerizable therewith; and (II) a catalytic amount of a photo-initiator.

15. The photopolymerizable composition of claim 14, wherein the photopolymerizable oligomer is in an amount of 10 to 50 mol % per 100 mol % of the polymerizable component.

16. A transparent cured product obtained by curing the photopolymerizable composition of claim 1 upon the irradiation with active energy rays.

17. A plastic lens composed of a transparent cured product of claim 16.

18. A method of producing plastic lenses by pouring the photopolymerizable composition of claim 10 to avoid improper dependency into a mold, and irradiating the poured composition with active energy rays from the outer sides thereof to cure the photopolymerizable composition.

* * * * *